(No Model.) 2 Sheets—Sheet 1.
C. A. ANDERSON.
SEED DROPPING ATTACHMENT FOR PLOWS.
No. 434,749. Patented Aug. 19, 1890.
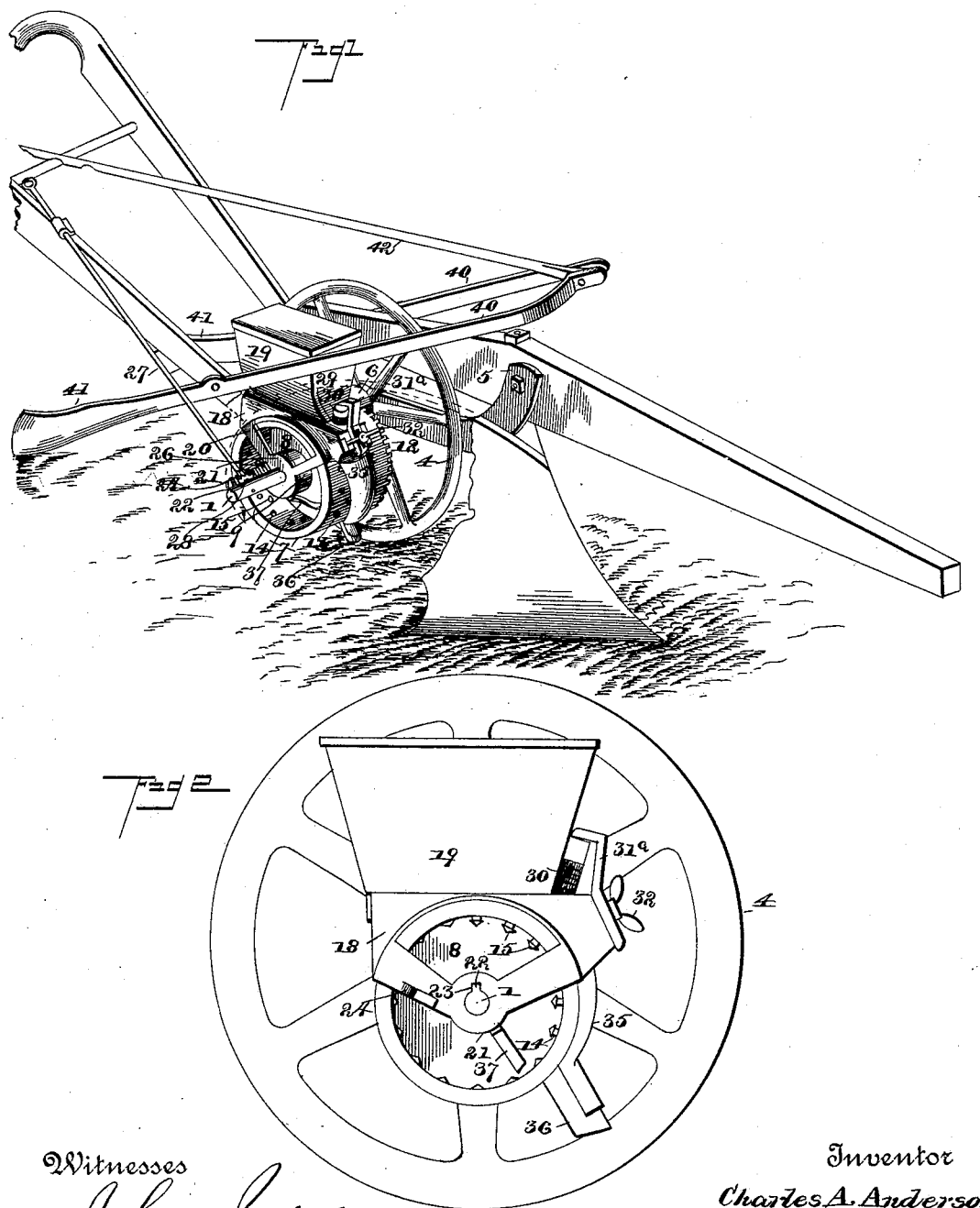
Witnesses
John Imirie
Wm. Bagger
Inventor
Charles A. Anderson
By his Attorneys
C A Snow & Co.

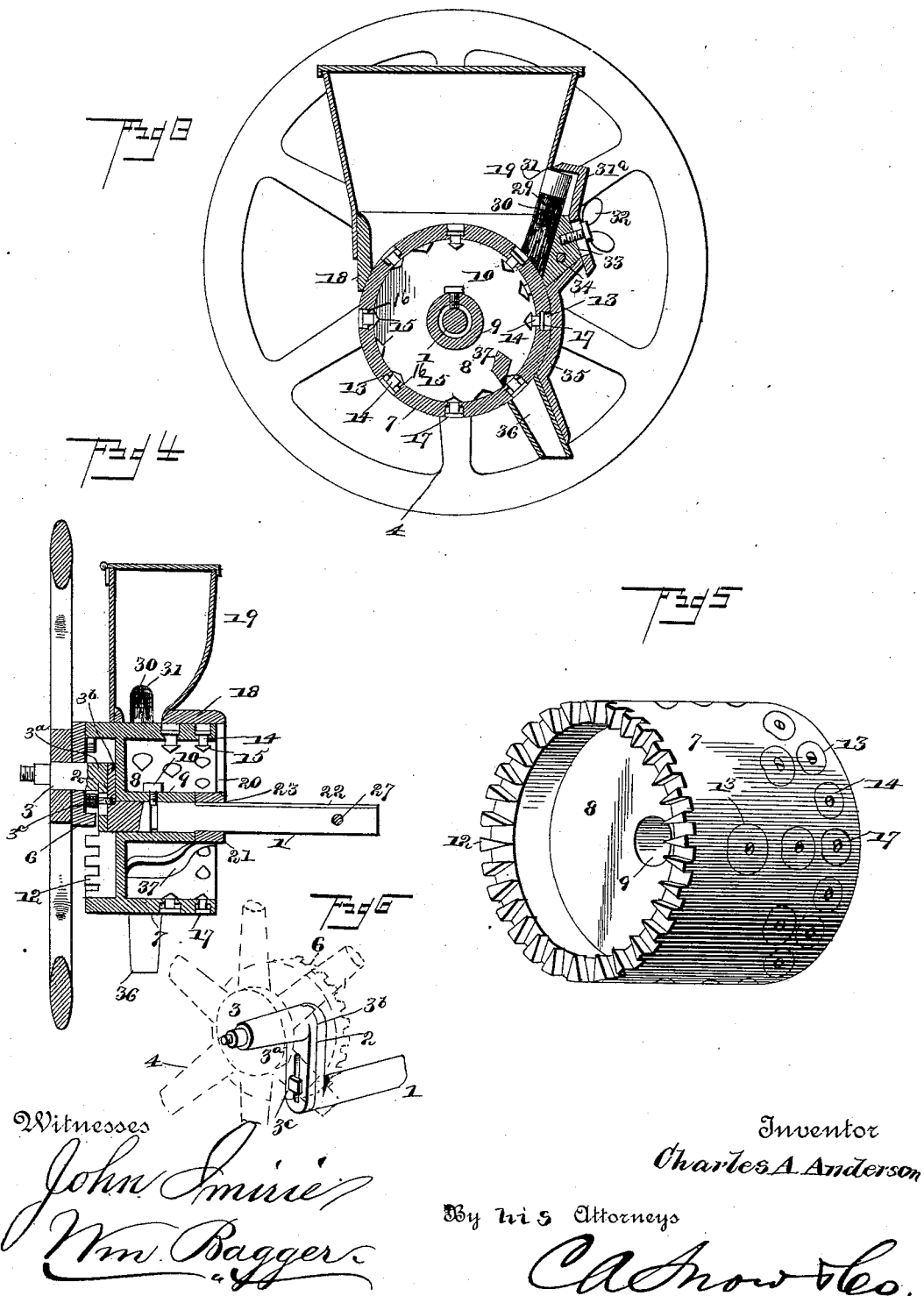

UNITED STATES PATENT OFFICE.

CHARLES ALBERT ANDERSON, OF CASEYVILLE, KENTUCKY.

SEED-DROPPING ATTACHMENT FOR PLOWS.

SPECIFICATION forming part of Letters Patent No. 434,749, dated August 19, 1890.

Application filed December 6, 1889. Serial No. 332,766. (No model.)

*To all whom it may concern:*

Be it known that I, CHARLES ALBERT ANDERSON, a citizen of the United States, residing at Caseyville, in the county of Union and State of Kentucky, have invented a new and useful Seed-Dropping Attachment for Plows, of which the following is a specification.

This invention relates to seed-dropping attachments for plows; and it has for its object to construct a device which will be capable of being attached for operation to any plow of ordinary construction, and by means of which corn and other seed may be planted in any desired quantities and in hills any desired distance apart, or in check-rows.

The invention consists in the improved construction, arrangement, and combination of parts, which will be hereinafter fully described, and particularly pointed out in the claims.

In the drawings hereto annexed, Figure 1 is a perspective view showing my improved seed-planter attachment applied to a plow in position for operation. Fig. 2 is a side view of the seed-dropping attachment detached. Fig. 3 is a longitudinal vertical sectional view of the same. Fig. 4 is a vertical transverse sectional view. Fig. 5 is a detail view of the seed-wheel. Fig. 6 is a detail view.

Like numerals of reference indicate like parts in all the figures.

1 designates a shaft or axle, which is provided at one end with a crank 2, from the end of which a stub-axle 3 extends in an outward direction. Said crank is composed of two parts $3^a$ $3^b$, mounted to slide upon each other and connected by a transverse bolt $3^c$. The stub-axle 3 is thereby rendered adjustable with relation to the shaft 1. Upon the said stub-axle is mounted the operating or furrow wheel 4, and adjacent to the outer side of the latter is mounted a bracket 5, by means of which the device may be attached to a plow-beam in position for operation by means of bolts or clips, or any other suitable manner. The inner side of the furrow-wheel is provided with a crown-wheel or pinion 6, adapted to transmit motion to the seed-wheel 7. The latter, which is journaled upon the shaft or axle 1, consists of a drum or cylinder connected by means of spokes or by a web 8 with a hub 9, which is to be journaled upon the shaft 1, and which is provided with a radial set-screw 10, the inner end or point of which works in an annular groove upon the shaft 1, in order to prevent the lateral displacement of the drum or seed-wheel upon the latter. The inner end of the drum is provided with teeth or spurs 12, adapted to mesh with pinion 6, so as to receive motion from the latter.

The speed of the drum or seed-wheel may be regulated by the size of the pinion 6, and pinions of various sizes may be used by adjusting the crank 2 and stub-axle 3 with relation to the shaft 1, as above described.

The outer cylinder of the drum or seed-wheel is provided with several circumferential series of radial perforations 13, of which those in each series are located at different distances apart and are made of different sizes, so as to accommodate varying quantities of seed. Suitably arranged in the openings 13 are the radially-movable plugs 14, the inner ends of which are provided with conical flanged heads 15, which prevent the plugs from dropping out in an outward direction. The inner ends of the openings 13 are provided with flanges 16, and the outer ends of the plugs 14 have flanges 17 to prevent the said plugs from being displaced in an inward direction. As the drum or seed-wheel revolves, the plugs 14, when they approach the upper side, will by gravity drop to the inner ends of the openings 13, which thus constitute seed-cups. As the wheel continues to revolve, the plugs 14 will be forced by mechanism to be hereinafter described in an outward direction and thus discharge the contents of the seed-cups.

18 designates a frame supporting the hopper 19, and provided at one of its ends with brackets 20, carrying a hub 21, which is mounted upon the outer end of the shaft 1. The latter is provided with a longitudinal key or spline 22, engaging a groove 23 in the hub 21, which is thereby prevented from rotating upon the shaft, while at the same time it is capable of lateral adjustment thereon.

The hub 21 is provided with a laterally-extended bracket 24, parallel to the shaft 1 and provided with a rack-bar 26. Journaled in an opening formed transversely in the shaft 1 is a rearwardly-extending shaft 27, having a pinion 28, which engages the rack-bar 26. It will be seen that by rotating the shaft 27, which extends rearwardly to within convenient reach of the operator, the latter may adjust the frame 18 and its attachments laterally to any desired position with relation to the drum or seed-wheel.

The front end of the frame is provided with a recess 29, in which is arranged a brush 30, extending through an opening 31 in the front wall of the hopper and bearing against the face of the drum or seed-wheel. This brush forms a cut-off to remove superfluous seed from the seed-cups.

To the front end of the frame 18 is attached a hooked arm or bracket 31ª, vertically adjustable by means of a thumb-screw 32, which extends through a slot 33 in the said bracket. The hook at the upper end of the latter is arranged to bear against the upper end of the brush 30, which is thereby held in position. By this mechanism the brush or cut-off may be gradually forced in a downward direction, so as to compensate for wear.

Secured to the front end of the frame 18 by means of a transverse pin or bolt 34 is a downwardly-extending curved arm 35, which bears against the face of the seed-wheel, and is provided at its lower end with a seed-tube 36. Suitably secured to the hub 21 at a point registering with the said seed-tube is an arm or bracket 37, which is adapted to bear against the conical heads at the inner ends of the plugs 14 in the seed-cups, as the latter pass successively under the said bracket. The said plugs will thereby be forced in an outward direction, and the contents of the seed-cups will be discharged into the seed-tube.

40 40 designate a pair of arms or levers, which are attached pivotally to the handles of the plow to which my improved seed-dropping attachment is attached for operation. The said arms or levers are provided with rearwardly-extending covering-blades 41 of suitable construction, and the forwardly-extending ends of said levers are connected pivotally with an operating-rod 42, which extends rearwardly, and which may be attached adjustably to the upper rung of the plow-handles. By means of the said operating-rod the operator is enabled to adjust the coverers into or out of operative position, as may be desired.

The operation and advantages of this invention will be readily understood from the foregoing description, taken in connection with the drawings hereto annexed. The device may be attached for operation to any plow of ordinary construction. By adjusting the frame carrying the hopper laterally with relation to the seed-wheel or drum the hopper may be made to register with seed-cups of any desired capacity and at varying distances apart, and the quantity of seed deposited at each operation, as well as the distance between the hills, may thus be easily regulated. By having the seed-cups at the proper distance apart, or by blocking every alternate seed-cup of one of the series, the seed may be dropped in check-rows when desired. The operating-wheel travels in the furrow made by the plow, and the operation of the device will therefore be even and regular. The seed will be dropped unfailingly in the furrow opened by the plow, and the covering devices, which may be used whenever desired, may be adjusted to cover the seed to any desired depth.

Having thus described my invention, what I claim is—

1. In a seed-dropping attachment for plows, the combination of a crank shaft or axle, an operating-wheel mounted upon the crank of the latter, a drum or seed-wheel mounted upon the said shaft, and mechanism for transmitting motion from the said drum to the operating-wheel, substantially as and for the purpose set forth.

2. The combination of the crank shaft or axle, the seed-wheel or drum mounted upon the same and provided with teeth or spurs at its inner edge, and the operating-wheel mounted upon the crank of said axle and having a crown-wheel or pinion meshing with the spurs of the seed-wheel, substantially as set forth.

3. The combination of the crank shaft or axle, the drum or seed-wheel mounted on the same, the operating-wheel journaled upon the crank of said axle, and a bracket mounted pivotally upon said crank adjacent to the operating-wheel and adapted to be attached to a plow-wheel, substantially as set forth.

4. The combination of the crank shaft or axle, the seed-wheel mounted upon the same and having several circumferential series of seed-cups, and a frame supported laterally and adjustably upon the said shaft and carrying the hopper, substantially as set forth.

5. The combination of the drum or seed-wheel mounted revolubly upon a shaft and having several circumferential series of radial perforations or seed-cups, the plugs arranged to slide radially in the said seed-cups, a frame supported laterally adjustably upon the said shaft, the hopper mounted upon the said frame, and a curved arm or bracket attached to the front end of said frame extending downwardly in contact with the face of the seed-wheel and having a seed-tube at its lower end, substantially as set forth.

6. The combination of the shaft, the drum or seed-wheel mounted revolubly thereon and having several circumferential series of radial perforations or seed-cups, the plugs arranged to slide radially in said perforations, a frame supported upon the said shaft by means of a hub having a groove to engage a spline upon the latter, the hopper supported upon said frame, a curved arm extending downwardly from the front end of said frame in contact with the case of the seed-wheel, and having a seed-tube at its lower end, and an arm extending downwardly from the laterally-adjustable frame and adapted to engage the inner ends of the radial sliding plugs, substantially as and for the purpose set forth.

7. The combination, with the seed-wheel mounted revolubly upon a shaft and having radial seed-cups or perforations, of the plugs arranged to slide radially in said perforations, and having shoulders to engage flanges at the inner edges of the latter, and provided with conical flanged heads at their inner ends, and a frame supported laterally adjustably upon the shaft and having the hopper, the seed-tube, and an arm adapted to engage the conical heads at the inner ends of the radially-sliding plugs, substantially as set forth.

8. The combination of the shaft, the seed-wheel mounted revolubly upon the same and provided with a set-screw extending radially through its hub into an annular groove in said shaft, a frame mounted upon the shaft by means of a hub having a groove to engage a spline upon said shaft, the hopper supported upon said frame, the seed-tube, and an arm extending laterally upon the said frame and having a rack-bar and a shaft journaled transversely with relation to the said shaft, and having a pinion engaging the said rack-bar, substantially as and for the purpose set forth.

9. The combination of the shaft, the revoluble seed-wheel having several circumferential series of perforations or seed-cups, the frame mounted laterally adjustable upon said shaft and carrying the hopper and the seed-wheel, and a brush or cut-off arranged in a recess at the front end of the frame, extending through the front wall of the hopper and bearing against the face of the seed-wheel, and a vertically-adjustable hooked arm or bracket secured to the front end of the frame by means of a thumb-screw and bearing downwardly against the upper end of said brush, substantially as set forth.

10. The combination, with a plow, of the herein-described seed-planting attachment, comprising the crank shaft or axle, an operating-wheel journaled upon the crank of the same, a bracket mounted pivotally upon said crank and adapted to be attached to the plow-beam, the seed-wheel mounted revolubly upon the shaft or axle and having teeth or spurs meshing with a pinion upon the inner side of the operating-wheel, a frame mounted laterally adjustable upon the shaft and having the hopper and seed-wheel, and provided with a bracket adapted to actuate plugs mounted to slide radially in the radial perforations of the seed-wheel, the arms or levers attached pivotally to the plow-handles and having rearwardly-extending covering-blades, and an operating-rod connected pivotally with the front ends of said levers, substantially as and for the purpose herein set forth.

11. The combination of the main shaft having the crank composed of two parts mounted slidingly upon each other and connected adjustably by a transverse bolt, with the stub-axle extending outwardly from said crank, substantially as set forth.

12. The combination of the main shaft having the crank composed of two parts mounted slidingly upon each other and connected adjustably by a transverse bolt, the outwardly-extending stub-axle, the operating-wheel and pinion mounted upon said stub-axle, and the seed-wheel having teeth meshing with the said pinion, substantially as described, and for the purpose set forth.

In testimony that I claim the foregoing as my own I have hereto affixed my signature in presence of two witnesses.

CHARLES ALBERT ANDERSON.

Witnesses:
SAML. T. CASEY,
JOHN NELSON.